United States Patent
Takahashi

(10) Patent No.: US 9,616,708 B2
(45) Date of Patent: Apr. 11, 2017

(54) VEHICLE-WHEEL BEARING DEVICE WITH SENSOR

(71) Applicant: NTN CORPORATION, Osaka (JP)

(72) Inventor: Toru Takahashi, Iwata (JP)

(73) Assignee: NTN CORPORATION, Osaka (JP)

( * ) Notice: Subject to any disclaimer, the term of this patent is extended or adjusted under 35 U.S.C. 154(b) by 37 days.

(21) Appl. No.: 14/411,116

(22) PCT Filed: Jun. 18, 2013

(86) PCT No.: PCT/JP2013/066659
§ 371 (c)(1),
(2) Date: Dec. 24, 2014

(87) PCT Pub. No.: WO2014/002820
PCT Pub. Date: Jan. 3, 2014

(65) Prior Publication Data
US 2015/0375563 A1    Dec. 31, 2015

(30) Foreign Application Priority Data

Jun. 27, 2012 (JP) ................................ 2012-144458

(51) Int. Cl.
*B60B 27/00* (2006.01)
*G01L 5/16* (2006.01)
(Continued)

(52) U.S. Cl.
CPC ...... *B60B 27/0068* (2013.01); *B60B 27/0005* (2013.01); *F16C 19/522* (2013.01);
(Continued)

(58) Field of Classification Search
CPC .... G01B 7/30; G01L 5/00; G01L 3/14; G01L 3/101; G01D 7/00; G01N 3/00; G16C 41/00; F16C 41/00
(Continued)

(56) References Cited

U.S. PATENT DOCUMENTS 6,658,943 B2   12/2003   McDearmon
RE39,838 E     9/2007    McDearmon
(Continued)

FOREIGN PATENT DOCUMENTS

EP   2642265 A1   9/2013
EP   2708865 A1   3/2014
(Continued)

OTHER PUBLICATIONS

International Search Report mailed Jul. 30, 2013, in corresponding International Patent Application No. PCT/JP2013/066659.
(Continued)

*Primary Examiner* — Lisa Caputo
*Assistant Examiner* — Octavia Hollington

(57) ABSTRACT

A vehicle-wheel bearing device with a sensor of the present invention includes a plurality of sensors, mounted to a vehicle-wheel bearing, for detecting load thereon, and signal processor for processing an output signal therefrom to generate a signal vector, and load calculator for calculating load acting on a wheel based on the signal vector. The load calculator includes: a coefficient conversion processing unit for calculating an actual-state load estimation coefficient MC that is a load estimation coefficient for a state where the bearing is mounted to an actual vehicle, based on a standard load estimation coefficient MB that is a determined standard load estimation coefficient for the bearing; and a load calculation unit for calculating load on the wheel based on the signal vector and the actual-state load estimation coefficient MC calculated by the coefficient conversion processing unit.

16 Claims, 5 Drawing Sheets

(51) Int. Cl.
    *F16C 41/00*     (2006.01)
    *F16C 19/52*     (2006.01)
    *G01L 5/00*     (2006.01)
    *F16C 19/18*     (2006.01)

(52) U.S. Cl.
    CPC .......... *F16C 41/007* (2013.01); *G01L 5/0019* (2013.01); *G01L 5/16* (2013.01); *F16C 19/184* (2013.01); *F16C 2326/02* (2013.01)

(58) Field of Classification Search
    USPC .......................... 73/862.041, 862, 322, 795
    See application file for complete search history.

(56) References Cited

U.S. PATENT DOCUMENTS

| | | | |
|---|---|---|---|
| 7,501,811 B2 * | 3/2009 | Ono | G01D 5/24438 |
| | | | 324/207.25 |
| 8,540,431 B2 | 9/2013 | Nishikawa et al. | |
| 8,567,260 B2 | 10/2013 | Nishikawa et al. | |
| 9,011,013 B2 | 4/2015 | Norimatsu et al. | |
| 9,404,540 B2 * | 8/2016 | Takahashi | B60B 27/0068 |
| 2002/0092360 A1 | 7/2002 | McDearmon | |
| 2011/0185823 A1 | 8/2011 | Nishikawa et al. | |
| 2012/0014632 A1 | 1/2012 | Nishikawa et al. | |
| 2013/0223778 A1 | 8/2013 | Takahashi et al. | |
| 2014/0086517 A1 | 3/2014 | Norimatsu et al. | |
| 2014/0212081 A1 | 7/2014 | Takahashi et al. | |

FOREIGN PATENT DOCUMENTS

| | | |
|---|---|---|
| EP | 2762848 A1 | 8/2014 |
| JP | 2003-530565 | 10/2003 |
| JP | 2005-140606 | 6/2005 |
| JP | 2007-309711 | 11/2007 |
| JP | 2008-542735 | 11/2008 |
| JP | 2010-2313 | 1/2010 |
| JP | 2010-181154 | 8/2010 |
| JP | 2010-242902 | 10/2010 |
| JP | 2012-103221 | 5/2012 |
| WO | WO 01/77634 A2 | 10/2001 |
| WO | WO 2006/128878 A1 | 12/2006 |
| WO | WO 2012/066995 A1 | 5/2012 |

OTHER PUBLICATIONS

International Preliminary Report on Patentability mailed Jan. 8, 2015 in corresponding International Patent Application No. PCT/JP2013/066659.

Extended European Search Report dated Jan. 26, 2016 in corresponding European Patent Application No. 13809021.2.

Chinese Office Action dated Aug. 25, 2015 in corresponding Chinese Patent Application No. 201380033252.8.

Japanese Office Action dated Oct. 13, 2015 in corresponding Japanese Patent Application No. 2012-144458.

Japanese Office Action dated Jan. 5, 2016 in corresponding Japanese Application No. 2012-144458.

\* cited by examiner

VEHICLE-WHEEL BEARING DEVICE WITH SENSOR

CROSS REFERENCE TO THE RELATED APPLICATION

This application is a U.S. National Stage Application, which claims the benefit under 35 U.S.C. §371 of PCT International Patent Application No. PCT/JP2013/066659, filed Jun. 18, 2013, which is based on and claims the foreign priority benefit under 35 U.S.C. §119 of Japanese patent application No. 2012-144458, filed Jun. 27, 2012, the entire disclosures of which are herein incorporated by reference as a part of this application.

BACKGROUND OF THE INVENTION

Field of the Invention

The present invention relates to vehicle-wheel bearing devices with sensors, which include load sensors for detecting load on bearing portions of wheels.

Description of Related Art

As a technique for detecting load on each wheel of an automobile, a vehicle-wheel bearing with a sensor has been suggested which detects load, based on strain on an outer diameter surface of an outer ring of a vehicle-wheel bearing, by the strain being detected by a strain gauge attached to the outer diameter surface of the outer ring (for example, Patent Document 1). Further, a calculation method for estimating load acting on a wheel based on output signals from a plurality of strain sensors provided in the wheel has been suggested (for example, Patent Document 2).

RELATED DOCUMENT

Patent Document

[Patent Document 1] JP Laid-open Patent Publication No. 2003-530565

[Patent Document 2] JP Laid-open Patent Publication No. 2008-542735

[Patent Document 3] JP Laid-open Patent Publication No. 2010-242902

SUMMARY OF THE INVENTION

Problems to be Solved by the Invention

In a case where load acting on a wheel is estimated by using a strain sensor as in the techniques disclosed in Patent Documents 1 and 2, a problem with drift occurring in the sensor due to the environmental temperature or initial drift due to strain induced by mounting of the sensor, arises.

In order to solve the aforementioned problem, a vehicle-wheel bearing device with a sensor has been also suggested which has a plurality of sensor units mounted to a stationary ring of a bearing, calculates a difference in amplitude between output signals from the sensor units opposing each other, and performs calculation by using the calculated value of the difference depending on cases, to estimate an input load (Patent Document 3). Further, a load estimation coefficient used for calculating load in such a vehicle-wheel bearing device with a sensor may be changed according to, for example, brake ON.OFF information which may exert an influence on a calculation result, to execute the calculation.

However, in the vehicle-wheel bearing device with the sensor as disclosed in Patent Document 3, as a load estimation coefficient used for calculating load, load estimation coefficients for different use conditions need to be calculated based on a load estimation coefficient that is previously obtained by a load testing machine, as described below.

A relationship in correspondence between a sensor output signal, and loads Fx, Fy, Fz or moment loads Mx, Mz on a vehicle-wheel bearing in the respective directions, or the like can be obtained based on a result of a load test by a testing machine. However, if a load estimation coefficient MB obtained by the testing machine is used, as it is, for calculating load, load cannot be accurately obtained in a vehicle running state. The cause is that an orientation with which the vehicle-wheel bearing is mounted and/or rigidity near mounting members are different between the testing machine and an actual vehicle.

Although load application tests can be executed with various mounting orientations by using a testing machine, influence of rigidity of a knuckle member and a suspension member of an actual vehicle need to be also reproduced. Therefore, problems arise that time and labor are required for the test and it is not practical. Further, the same type of bearing may be mounted and used at any position of a vehicle, and load needs to be calculated regardless of whether a bearing mounting position is a front position, a rear position, a left position, or a right position of the vehicle. Therefore, a load estimation coefficient MC needs to be calculated according to actual use conditions by using the standard load estimation coefficient MB obtained by the testing machine.

An object of the present invention is to provide a vehicle-wheel bearing device with a sensor, which is capable of calculating and outputting an accurate load by using a load estimation coefficient based on use conditions of a vehicle-wheel bearing.

A vehicle-wheel bearing device with a sensor according to the present invention includes: a vehicle-wheel bearing for rotatably supporting a wheel relative to a vehicle body including an outer member having an inner periphery formed with a plurality of raceways, an inner member having an outer periphery formed with raceways held in face to face relation to the raceways of the outer member, and a plurality of rows of rolling elements interposed between the raceways of the outer member and the inner member that are held in face to face relation to each other, the vehicle-wheel bearing supporting a wheel such that the wheel is rotatable relative to a vehicle; a plurality of sensors 20, mounted to the vehicle-wheel bearing, for detecting load on the bearing; signal processor 31 for processing an output signal from each sensor 20 to generate a signal vector; and load calculator 32 for calculating load on the wheel based on the signal vector.

The load calculator 32 includes: a coefficient conversion processing unit 33 for calculating an actual-state load estimation coefficient MC that is a load estimation coefficient for a state where the bearing is mounted to an actual vehicle, based on a standard load estimation coefficient MB that is a determined standard load estimation coefficient for the bearing; and a load calculation unit 34 for calculating load on the wheel based on the signal vector and the actual-state load estimation coefficient MC calculated by the coefficient conversion processing unit 33. The determined standard load estimation coefficient MB represents, for example, a load estimation coefficient obtained by a load test performed on a bearing that has not been mounted to a vehicle. The sensors (20) are mounted to the vehicle-wheel bearing. The signal processor 31 and the load calculator 32 may be mounted to the vehicle-wheel bearing or may be provided in, for example, an ECU or an inverter device of the vehicle so as to be distant from the vehicle-wheel bearing.

In this configuration, characteristics of the vehicle-wheel bearing including individual differences are obtained by a testing machine, to prepare an individual standard load estimation coefficient MB, whereby the coefficient conversion processing unit 33 of the load calculator 32 corrects, by using the conversion coefficient, difference in characteristic due to use conditions, such as difference of a material and a shape of a knuckle member to which the bearing is fixed, difference between the left and right wheels, or difference in bearing mounting orientation, to calculate the actual-state load estimation coefficient MC according to use conditions. Therefore, an accurate load can be calculated and outputted by using a load estimation coefficient based on use conditions of a vehicle-wheel bearing.

In one embodiment of the present invention, the coefficient conversion processing unit 33 of the load calculator 32 may include: a conversion coefficient storage section 35 to store a conversion coefficient T(k) written therein and used for conversion from the standard load estimation coefficient MB to the actual-state load estimation coefficient MC; and a parameter storage section 36 to store a parameter k written therein and used for designating a state under which the bearing is mounted to the vehicle.

In one embodiment of the present invention, the parameter k written in the parameter storage section 36 may include at least one of a parameter for designating a vehicle type, a parameter for designating a position at which the bearing is mounted, and a parameter for designating an ON. OFF state of a brake.

In one embodiment of the present invention, the coefficient conversion processing unit 33 of the load calculator 32 may include a wheel-position-corresponding transform command section for providing a command for transforming a sequence of the signal vector to be inputted from the signal processor 31 to the load calculation unit of the load calculator 32 and transforming a sequence of the actual-state load estimation coefficient MC to be supplied from the coefficient conversion processing unit 33 to the load calculation unit, according to whether a mounting position is a left-side position or a right-side position of the wheel.

In this configuration, when the bearing has a bilaterally symmetric shape, a conversion coefficient for a mounting position only for one side may be prepared, for both sides, by swapping a sequence of a signal vector and transforming a sequence of the actual-state load estimation coefficient MC according to a command from the wheel-position-corresponding transform command section, whereby not all the conversion coefficients may be prepared, and a memory region can be saved.

In this case, the signal processor 31 may include a swapping circuit 43 for transforming a sequence of the signal vector according to the command from the wheel-position-corresponding transform command section.

In one embodiment of the present invention, a series of sequencing processes for calculating the actual-state load estimation coefficient MC by the coefficient conversion processing unit 33 of the load calculator 32 may be executed in an initialization process.

In one embodiment of the present invention, the bearing is attached with an ID memory 38 in which ID information to identify a bearing is written may be provided on the bearing, and the coefficient conversion processing unit 33 of the load calculator 32 may include a nonvolatile ID memory 40 into which the ID information read from the ID memory 38 is stored in the initialization process.

In this case, the coefficient conversion processing unit 33 of the load calculator 32 may have a function of reading the ID information from the ID memory 38 when power is ON, and comparing the ID information with ID information stored in the nonvolatile ID memory 40, to confirm whether or not connection to a normal bearing associated in an initial setting is established. "When power is ON" represents when power for the load calculator 32 has become ON, for example, represents when an accessory mode in a starting switch of a vehicle has become ON.

In one embodiment of the present invention, an MB memory 39 in which the standard load estimation coefficient MB is written may be provided on the bearing, and the coefficient conversion processing unit 33 of the load calculator 32 may be able to read the standard load estimation coefficient MB from the MB memory 39.

In one embodiment of the present invention, a data file of the standard load estimation coefficient MB designated by the ID information for identifying the bearing may be separately supplied from the outside to the coefficient conversion processing unit 33 of the load calculator 32.

In one embodiment of the present invention, three or more sensors 20 for detecting load on the bearing may be provided, and the load calculator 32 may calculate a load Fz on the vehicle-wheel bearing in the vertical direction, a load Fx thereon in a front-rear direction, and a load Fy thereon in an axial direction, based on output signals from the three or more sensors 20.

In one embodiment of the present invention, the sensors 20 for detecting load on the bearing may detect relative displacement between the outer member and the inner member.

In one embodiment of the present invention, the sensors 20 for detecting load on the bearing may detect a strain on a stationary member that is among the outer member and the inner member.

In this case, each sensor 20 may be implemented as a sensor unit 20 provided on an outer diameter surface of the stationary member that is among the outer member and the inner member, and the sensor unit 20 may include: a strain generation member that is in contact with and fixed to the outer diameter surface of the stationary member; and one or more strain detection elements for detecting a strain on the strain generation member.

In this case, four sensor units 20 may be disposed on an upper surface portion, a lower surface portion, a right surface portion, and a left surface portion, which are located, on the outer diameter surface of the stationary member, so as to correspond to upper-lower positions and left-right positions relative to a tire tread, such that the four sensor units are equally spaced from each other in a circumferential direction so as to be different in phase by 90 degrees.

When the four sensor units 20 are disposed as described above, a load Fz on the vehicle-wheel bearing in the vertical direction, a load Fx thereon in the front-rear direction, and a load Fy thereon in the axial direction can be estimated. Further, also when a state of load on the bearing is changed, a cycle for the rolling elements can be stably detected based on output signals from the sensor units 20 on a side on which load is applied, thereby enhancing accuracy for load estimation output.

Further, in this case, the sensor unit 20 may include: a strain generation member having three or more contact fixing portions that are in contact with and fixed to the outer diameter surface of the stationary member; and two or more strain detection elements, mounted to the strain generation member, for detecting a strain on the strain generation member.

In this case, the strain detection elements may be disposed between a first and a second contact fixing portions, of the strain generation member, adjacent to each other, and between the second and a third contact fixing portions thereof adjacent to each other, and an interval between the contact fixing portions adjacent to each other, or an interval between the strain detection elements adjacent to each other may be set to {n+½(n: integer)} times a pitch with which the rolling elements are arranged.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

One embodiment of the present invention will be described with reference to FIG. 1 to FIGS. 6A and 6B. In the present embodiment, a vehicle-wheel bearing 100 which is an inner ring rotation type of a third generation is used for supporting a drive wheel. In the description herein, an "outboard side" represents a side of the vehicle body that is closer to an outer side of the vehicle in a vehicle width direction and an "inboard side" represents a side of the vehicle body which is closer to the center of the vehicle in the vehicle width direction, when assembled in the vehicle.

Figure 1:
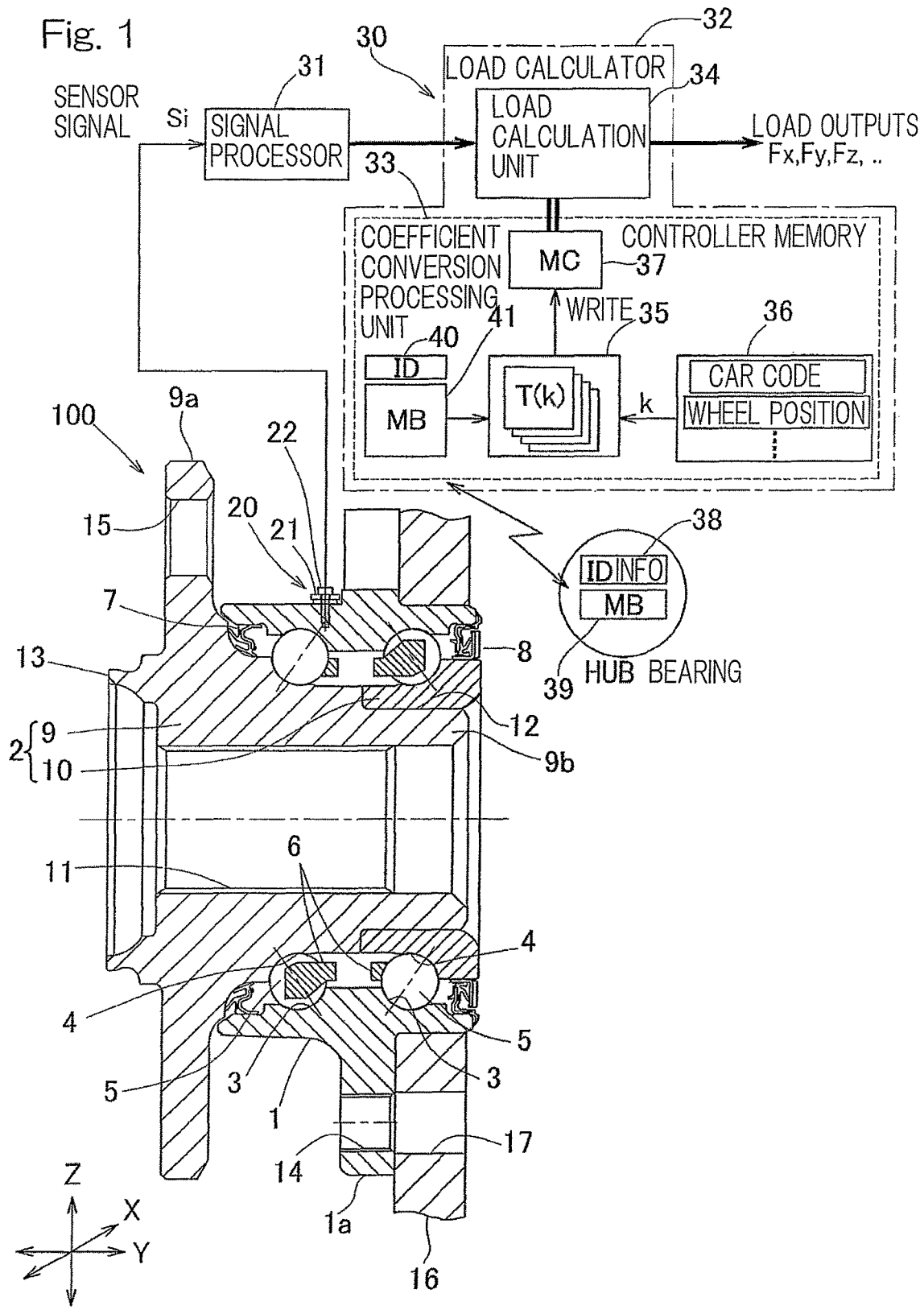
FIG. 1 shows, in combination, a cross-sectional view of a bearing of a vehicle-wheel bearing device with a sensor according to one embodiment of the present invention and a block diagram illustrating a conceptual configuration of a detection system of the device.

The vehicle-wheel bearing 100 of a vehicle-wheel bearing device with a sensor includes, as shown in a cross-sectional view of FIG. 1, an outer member 1 having an inner periphery formed with a plurality of raceways 3, an inner member 2 having an outer periphery formed with raceways 4 held in face to face relation to those raceways 3 of the outer member 1, and a plurality of rows of rolling elements 5 that are interposed between the raceways 3 of the outer member 1 and the raceways 4 of the inner member 2. The vehicle-wheel bearing 100 is implemented as a double row angular contact ball bearing, in which the rolling elements 5 are in the form of balls rollingly retained by a retainer 6 that is provided one for each row of the balls. The raceways 3, 4 have arcuate cross sectional shapes and are formed to have respective ball contact angles held in back-to-back relation with each other. Both ends of a bearing space between the outer member 1 and the inner member 2 are hermetically sealed by a pair of sealing members 7, 8.

The outer member 1 serves as a stationary member, and is of one piece construction having, on an outer periphery, a flange 1a for attachment to a vehicle body, and the flange 1a is mounted to a knuckle 16 of a suspension unit (not shown) of a vehicle body. The flange 1a has screw holes 14 for attachment to the knuckle, in plural portions in the circumferential direction, and knuckle bolts (not shown) are inserted into bolt insertion holes 17 of the knuckle 16 on the inboard side and screwed into the screw holes 14, to mount, to the knuckle 16, the flange 1a for attachment to the vehicle body.

The inner member 2 serves as a rotating member, and includes a hub axle 9 having a hub flange 9a for attachment to a wheel; and an inner ring 10 that is fitted onto an outer periphery of an end portion of an axle portion 9b of the hub axle 9 on the inboard side. The hub axle 9 and the inner ring 10 have the plurality of rows of the raceways 4. An inner ring fitting surface 12 having a stepped portion and a reduced diameter is formed on the outer periphery of the end of the hub axle 9 on the inboard side. The inner ring 10 is fitted onto the inner ring fitting surface 12. A through hole 11 is formed at the center of the hub axle 9. The hub flange 9a has press fitting holes 15 for receiving hub bolts (not shown) at a plurality of circumferential locations. A cylindrical pilot portion 13 for guiding a wheel and a brake component (both not shown) protrudes toward the outboard side near the root portion of the hub flange 9a of the hub axle 9.

Figure 2:
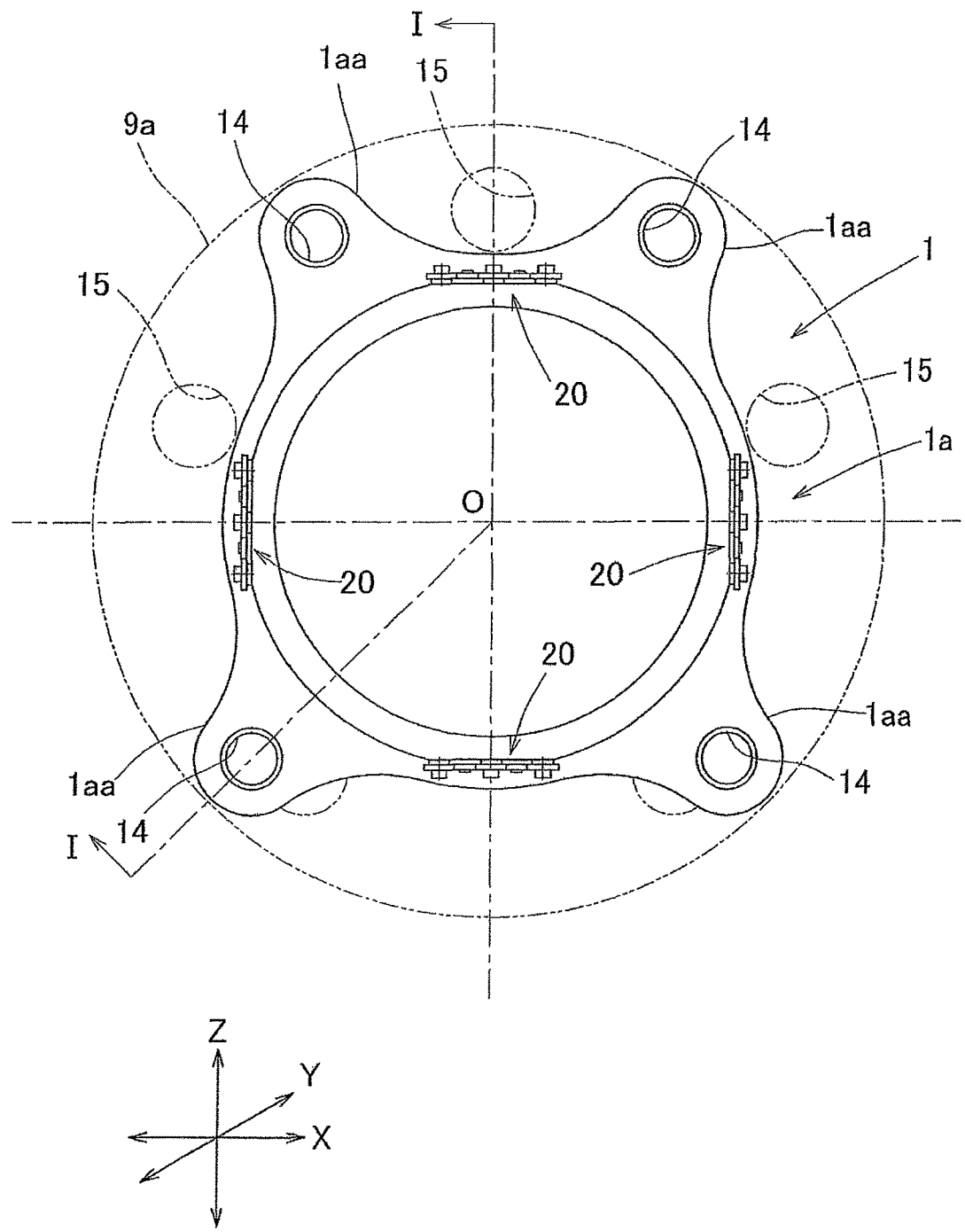
FIG. 2 is a front view of an outer member of the bearing, as viewed from an outboard side.

FIG. 2 is a front view of the outer member 1 of the vehicle-wheel bearing 100 as viewed from the outboard side. FIG. 1 is a sectional view as seen from the direction of arrows I-I in FIG. 2. The flange 1a for attachment to the vehicle body is a protruding piece 1aa which is a circumferential portion that has the screw hole 14 and protrudes toward the outer diameter side as compared to other portions.

Four sensor units 20 that serve as load detecting sensors are provided on an outer diameter surface of the outer member 1 that serves as the stationary member. In the description herein, the sensor units 20 are disposed on the upper surface portion, the lower surface portion, the right surface portion, and the left surface portion which are located, on the outer diameter surface of the outer member 1, so as to correspond to upper-lower positions and front-rear positions, relative to a tire tread.

A strain detection element 22 of each sensor unit 20 is connected to a detection system unit 30 shown in a block diagram of FIG. 1. The detection system unit 30 includes signal processor 31 for processing an output signal from each sensor unit 20 to generate a signal vector, and load calculator 32 for calculating load acting on a wheel based on the signal vector. The signal processor 31 and the load calculator 32 may not necessarily be integrated into the detection system unit 30, and may be separately provided. Further, the signal processor 31 and/or the load calculator 32 may be mounted to the vehicle-wheel bearing 100, or may be positioned in a vehicle, for example, near a main ECU (electric control unit) so as to be distant from the vehicle-wheel bearing 100, or positioned as, for example, a lower-order control portion of a comprehensive control unit of the ECU.

Figure 3:
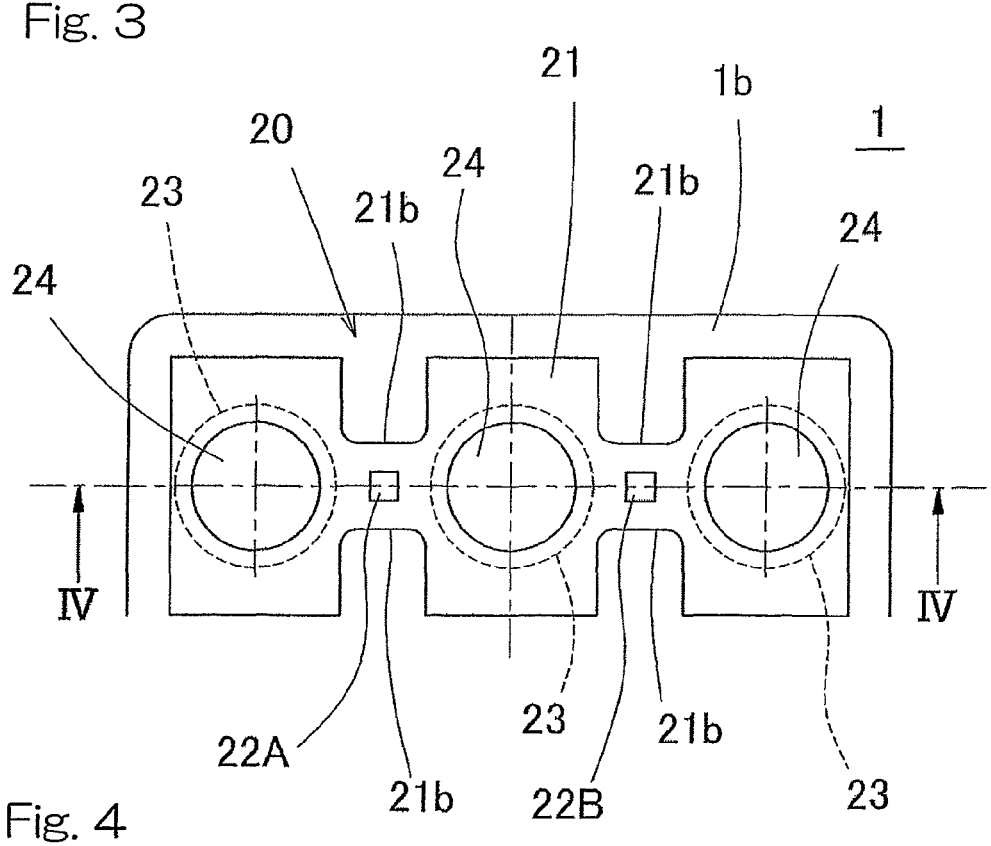
FIG. 3 is an enlarged cross-sectional view of an example of a sensor unit of the vehicle-wheel bearing device with the sensor.
Figure 4:
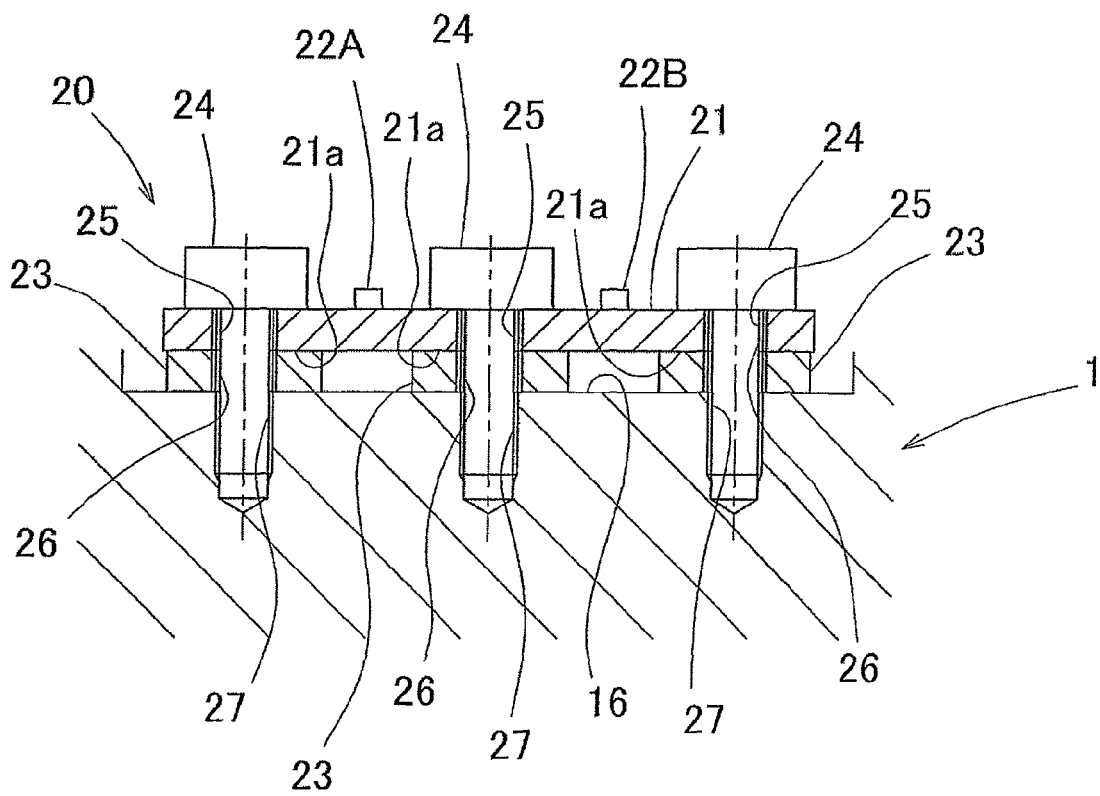
FIG. 4 is a sectional view as seen from the direction of arrows IV-IV in FIG. 3.

In the present embodiment, the sensor units 20 having an exemplary structure as shown in FIG. 2 to FIG. 4 are used as a sensor for detecting load acting on a wheel in each direction. Each sensor unit 20 includes, as described below in detail, a strain generation member 21 that is fixed to the outer member 1 at contact fixing portions 21a, and the strain detection element 22 (22A, 22B), mounted to the strain generation member 21, for detecting a strain on the strain generation member 21 (FIGS. 3, 4). In the exemplary structure shown in FIGS. 3 and 4, the two strain detection elements 22 (22A, 22B) are used for one sensor unit 20. However, one strain detection element 22 may be used for one sensor unit 20.

The load detecting sensor is not limited to one as shown in FIGS. 2 to 4. For example, a displacement sensor (eddy-current sensor, magnetic sensor, reluctance sensor, or the like) may be mounted to the stationary member that is among the outer member 1 and the inner member 2, and a target to be detected may be disposed in the rotatable ring, a relative displacement between the outer member 1 and the inner member 2 may be calculated, and an applied load may be calculated based on a previously obtained relationship between load and the displacement. That is, the structure according to the present embodiment is applicable to such a load sensor as to directly or indirectly detect a force applied between the inner member 2 and the outer member 1 of the bearing by using a sensor provided on the stationary member, to estimate an input load by calculation.

In order to calculate loads Fx, Fy, Fz in three directions of X, Y, Z directions, respectively, or moment loads in the respective directions, a configuration for calculation using information (sensor output signals) from at least three sensors is necessary. That is, the load detection system unit 30 is provided which generates signal vectors so as to be extracted by performing process/signal processing of a plurality of sensor signals as necessary, and executes load estimating calculation with the use of the signal vectors, to obtain an input load F (={Fx, Fy, Fz, . . . }).

In the load detection system unit 30 having such a configuration, load estimating calculation can be performed by determining a calculation coefficient matrix M and an offset Mo in numerical analysis or an experiment so as to satisfy the following relational expression in which, when the signal vector of each sensor signal is represented as S, the signal vector S represents an input, in a range in which a linear approximation is established.

$$F = M \cdot S + Mo \quad (1)$$

When the linear approximation range is appropriately set so as to correspond to a load input range, a wide range of input loads can be estimated based on the load estimation coefficient.

A relationship between an input load and the signal vector S of each sensor signal can be calculated such that, for example, load such as the loads Fx, Fy, Fz in the respective directions, or the moment loads Mx, Mz in the respective directions, is applied by a testing machine for applying load, to measure a sensor signal corresponding to the load. In the description herein, a standard load estimation coefficient (hereinafter, referred to as a standard load estimation coefficient) calculated by the testing machine is represented as MB by combining the coefficient M and the offset Mo in equation (1) with each other. Thus, equation (1) can be represented as the following relational equation $$F = MB \cdot S \quad (2)$$

However, in a case where the standard load estimation coefficient MB that is calculated as above, is applied, as it is, to sensor data obtained when an actual vehicle runs, a load estimation value is calculated so as to be different from an actual input load value, and load cannot be accurately calculated. The cause is that, as described in "Problems to be Solved by the Invention", a difference, in an orientation with which the vehicle-wheel bearing 100 is mounted, or a difference in rigidities of nearby components to which the bearing 100 is mounted, between a testing machine and an actual vehicle, may cause a difference in strain or deformation generated in the bearing 100. A state under which the bearing is mounted to an actual vehicle may be reproduced for the testing machine to perform load applying tests in various mounting orientations. However, in order to specifically reproduce an influence of a knuckle member or a suspension member of an actual vehicle, a complicated setting and a large-scale device are necessary. Therefore, time and labor are required for the test and realistic calibration cannot be performed.

Thus, in the vehicle-wheel bearing device with the sensor, the load calculator 32 shown in FIG. 1 includes: a coefficient conversion processing unit 33 for performing conversion of the standard load estimation coefficient MB obtained by a testing machine, based on actual use conditions, to calculate a load estimation coefficient (hereinafter, referred to as an actual-state load estimation coefficient) MC for an actual vehicle; and a load calculation unit 34 for calculating load acting on a wheel, based on the actual-state load estimation coefficient MC calculated by the coefficient conversion processing unit 33, and a signal vector generated by the signal processor 31.

The coefficient conversion processing unit 33 includes: a conversion coefficient storage section 35 to store a conversion coefficient T(k) written therein and used for conversion from the standard load estimation coefficient MB to the actual-state load estimation coefficient MC; a parameter storage section 36 to store a parameter k written therein and used for designating, for example, information as to, for example, a type of a vehicle to which the bearing 100 is mounted, a position of the wheel to which the bearing is mounted, or a state under which the bearing 100 is mounted to the vehicle; and an MC storage unit 37 in which the actual-state load estimation coefficient MC obtained by conversion is stored. The conversion coefficient storage section 35, the parameter storage section 36, and the MC storage unit are each implemented as a nonvolatile memory. The parameter k includes, as another parameter, a parameter used for designating an ON/OFF state of a brake.

On the other hand, on the vehicle-wheel bearing 100, an ID memory 38 in which ID information for identifying the bearing 100 is written, and an MB memory 39 in which the standard load estimation coefficient MB is written, are provided. Further, the coefficient conversion processing unit 33 of the load calculator 32 includes a nonvolatile ID memory 40 and a nonvolatile MB memory 41 in which the ID information and the standard load estimation coefficient MB read, by using communication means, from the ID memory 38 and the MB memory 39, respectively, are stored.

In the coefficient conversion processing unit 33 of the load calculator 32, when the bearing 100 is mounted to the vehicle, and connected to the detection system unit 30, the following initialization process is firstly performed. In the initialization process, the ID information and the standard load estimation coefficient MB are read from the ID memory 38 and the MB memory 39 on the bearing 100, to be copied into the nonvolatile ID memory 40 and the nonvolatile MB memory 41. Thereafter, the standard load estimation coefficient MB is converted to the actual-state load estimation coefficient MC by using the parameter k, written in the parameter storage section 36, which designates vehicle information, a position of the wheel to which the bearing is mounted, or the like. In this conversion, the conversion coefficient T(k) corresponding to use conditions having been set, that is, the parameter k, is selected from among the conversion coefficients T(k) that have been previously written in the conversion coefficient storage section 35, to change the standard load estimation coefficient MB.

For example, a process of adding a conversion coefficient as in the following equation can be performed.

$$MC=MB+T(k) \quad (3)$$

A value of the conversion coefficient T(k) can be calculated by using the actual-state load estimation coefficient MC according to a sensor output signal as calculated based on actual vehicle conditions, and the standard load estimation coefficient MB calculated in standard testing conditions, according to, for example, the following equation.

$$T(k)=MC-MB \quad (4)$$

In the coefficient conversion processing unit 33 shown in FIG. 1, it appears that one type of the actual-state load estimation coefficient MC is used. However, in practice, calculation is performed by switching among plural types of coefficients depending on an input load state such as inner/outer side of cornering, a wheel rotating speed, and an ON. OFF state of the brake. Therefore, a plurality of the actual-state load estimation coefficients MC are prepared. Also for the standard load estimation coefficient MB, a plurality of the standard load estimation coefficients MB are set according to input load states.

In the initialization process, in the coefficient conversion processing unit 33, a plurality of the actual-state load estimation coefficients MC are obtained by conversion, according to use conditions, from the standard load estimation coefficients MB read from the MB memory 39 of the bearing 100, and stored in the MC storage unit 37. Thus, after the initialization process has been ended, an estimated load is calculated by the load calculation unit 34 according to a signal vector of an inputted sensor output signal, and outputted.

In a configuration other than the above one, the ID memory 38 in which the ID information is stored may be merely mounted on the bearing 100, and data of the standard load estimation coefficient MB may be separately supplied, as a data file, to the coefficient conversion processing unit 33. In this case, in a case where a data file corresponding to the ID information has been supplied over a network or the like, data of the standard load estimation coefficient MB that corresponds to the ID information read from the ID memory 38, can be read, and a large memory for the standard load estimation coefficient MB need not be mounted on the bearing 100.

The ID information that is read from the ID memory 38 on the bearing 100 and stored in the nonvolatile ID memory 40 can be used for confirming connection between the bearing 100 and the detection system unit 30. That is, when power has become ON, the ID information is temporarily read from the ID memory 38 on the bearing 100, and whether or not a value of the ID information matches the ID information having been stored in the nonvolatile ID memory 40 of the coefficient conversion processing unit 33 in the initialization process, is determined. When there is a difference therebetween, for example, erroneous connection may be determined as occurring or the bearing 100 may be determined as being changed. According to the determination result, for example, a process of outputting information as to error to promote confirmation, or executing the initialization process again as necessary, can be performed. "When power has become ON" as described above represents when power for the detection system unit 30 or the load calculator 32 has become ON, for example, represents when an accessory mode in a starting switch of a vehicle has become ON.

Figure 6A:
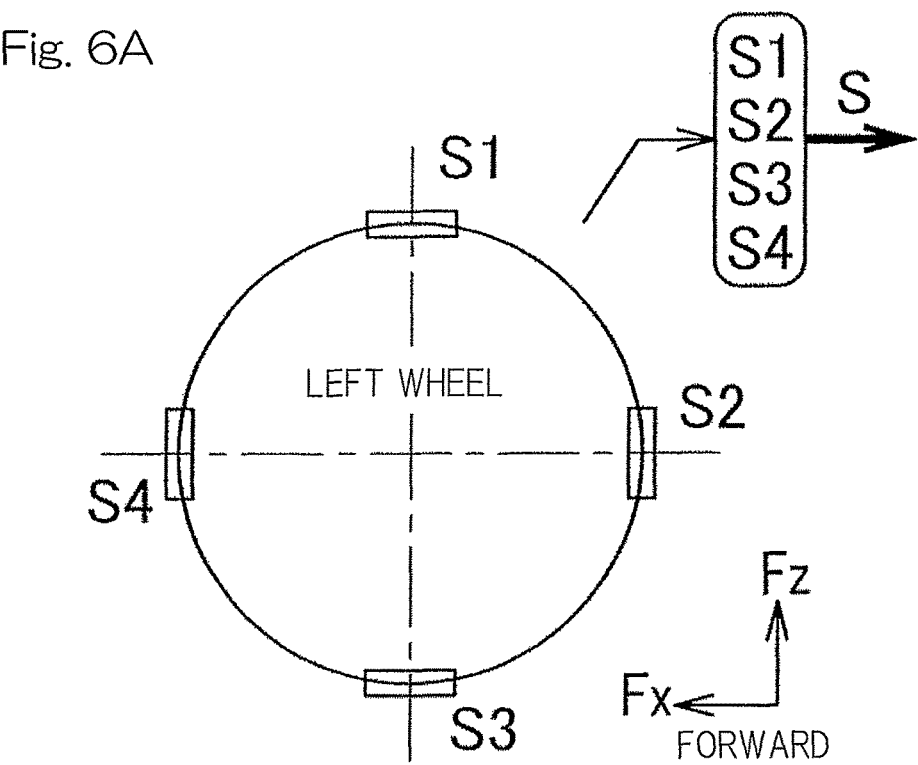
FIG. 6A illustrates a sequence of sensor output signals in the case of the same type of vehicle-wheel bearing being mounted to a left-side wheel.
Figure 6B:
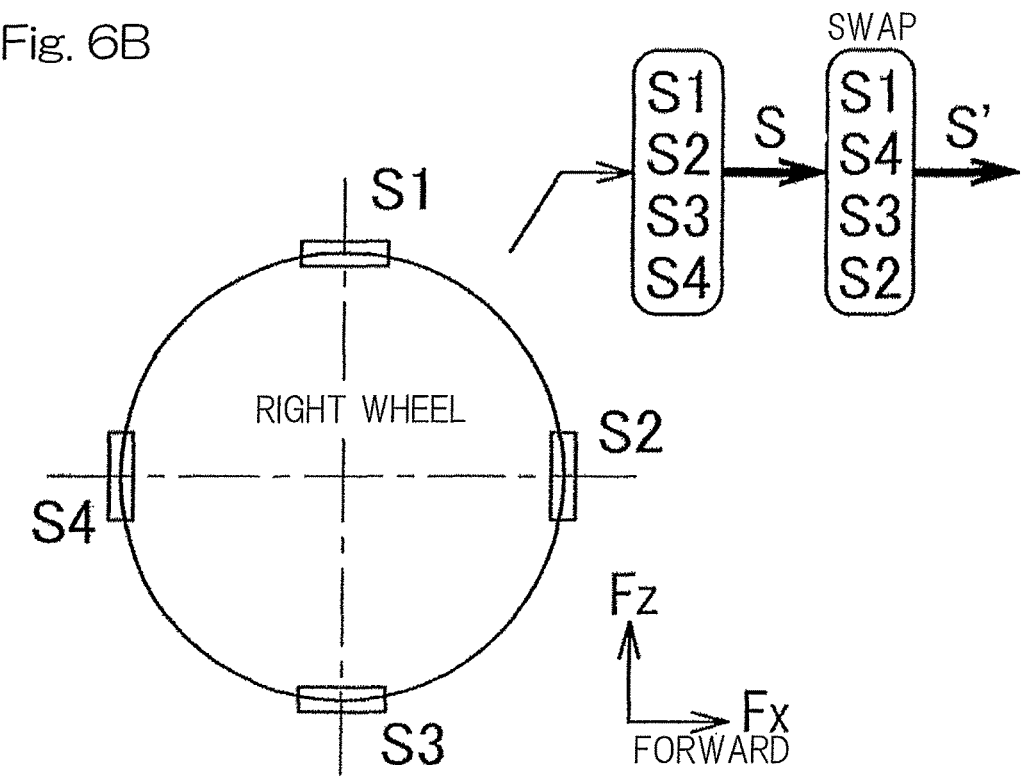
FIG. 6B illustrates a sequence of sensor output signals in the case of the same type of vehicle-wheel bearing being mounted to a right-side wheel.

FIGS. 6A and 6B show a difference between a sequence of the sensor output signals in the case of the vehicle-wheel bearing 100 being mounted to a left-side wheel and a sequence of the sensor output signals in the case of the same type of vehicle-wheel bearing 100 being mounted to a right-side wheel. FIG. 6A shows a case where the bearing is mounted to the left-side wheel, and FIG. 6B shows a case where the bearing is mounted to the right-side wheel. As in this example, in a case where structures other than an orientation with which the bearing 100 is mounted are symmetrical with respect to each other, the load estimation coefficients can be obtained by transforming a coordinate system. In FIG. 6A showing a case where the bearing is mounted to the left-side wheel, a sensor output signal corresponding to a sensor positioned in the front portion of the vehicle, is represented as S4, and, in the signal vector S of the output signals from all the sensors, a sequence forms (S1, S2, S3, S4), and thus the sensor output signals form a sequence of (upper, rear, lower, front).

On the other hand, in FIG. 6B showing a case where the bearing is mounted to the right-side wheel, a sensor output signal corresponding to a sensor positioned in the front portion of the vehicle, is represented as S2, and, in the signal vector S of the output signals from all the sensors, a sequence forms (S1, S2, S3, S4), and thus the sensor output signals form a sequence of (upper, front, lower, rear). When the sequence is transformed so as to form a signal vector S' having a sequence of (S1, S4, S3, S2), the signal vector S' can have the same signal structure as the signal vector S obtained in the case of the bearing being mounted to the left-side wheel, and can be inputted for calculation as it is.

Further, since directions of load may be inverted due to the left-right inversion, the coefficient conversion processing unit 33 may perform, as necessary, calculation corresponding to an affine transformation (for example, sign inversion) of the standard load estimation coefficient MB of the bearing 100. Therefore, by calculating the conversion coefficients T(k) for the left-side wheel according to comparison between data at the running and data by the testing machine, all the conversion coefficients T(k) for the right-side wheel need not be prepared, and a memory capacity for conversion coefficients can be reduced.

Figure 5:
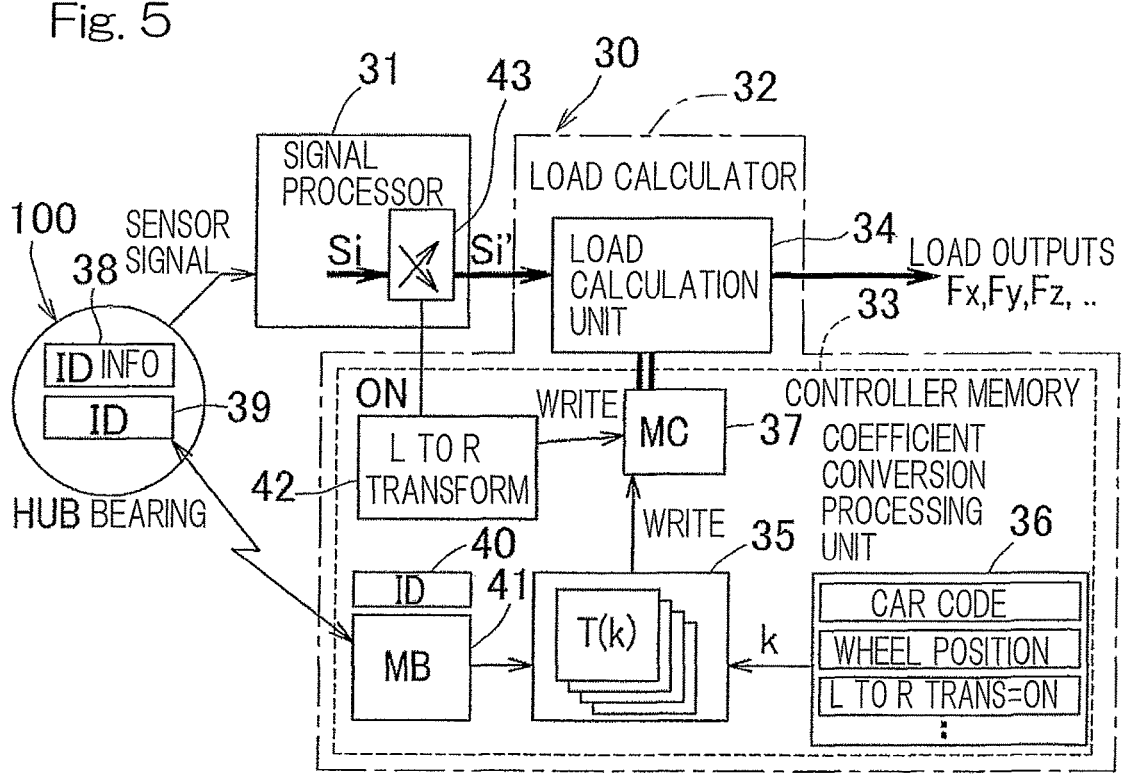
FIG. 5 is a block diagram illustrating another example of a configuration of the detection system.

FIG. 5 shows an exemplary configuration of the detection system unit 30 that is designed for the above case. In the exemplary configuration, the coefficient conversion processing unit 33 of the load calculator 32 includes a wheel-position-corresponding transform command section 42 for providing a command for transforming a sequence for a signal vector which is to be inputted from the signal processor 31 to the load calculation unit 34 of the load calculator 32, according to whether a bearing is mounted to a wheel at a left-side position or a right-side position, and a command for transforming a sequence for the actual-state load estimation coefficient MC which is to be supplied from the coefficient conversion processing unit 33 to the load calculation unit 34. Further, in accordance therewith, the signal processor 31 includes a swapping circuit 43 for transforming a sequence for the signal vector according to a command from the wheel-position-corresponding transform command section 42. The other configurations are the same as the exemplary configuration shown in FIG. 1.

Also in this exemplary configuration, as in the initialization process described above, the actual-state load estimation coefficient MC for the left-side wheel of an actual vehicle is calculated by using the conversion coefficient T(k) for the left-side wheel of the actual vehicle based on the standard load estimation coefficient MB of the bearing 100. Subsequent thereto, transforming for the right-side wheel is performed by a parameter (LtoR Transform) in the wheel-position-corresponding transform command section 42 being set to ON. Thus, the swapping circuit 43 of the signal processor 31 becomes ON, and a sequence for the signal vector is transformed to a sequence for the right-side wheel, and an affine transformation for the actual-state load estimation coefficient MC is performed, to set the actual-state load estimation coefficient MC again.

Next, an example of a specific configuration of each sensor unit 20 shown in FIG. 1, will be described. The sensor units 20 provided at four portions shown in FIG. 2 each include the strain generation member 21 and the two strain detection elements 22 (22A, 22B), mounted to the strain generation member 21, for detecting a stain on the strain generation member 21, as shown in an enlarged plan view and an enlarged cross-sectional view of FIG. 3 and FIG. 4. The strain generation member 21 is in the form of a thin plate member of not greater than 2 mm in thickness and made of an elastically deformable metallic material such as a steel material, and has a roughly belt-like shape, in a planar view, having a uniform width over the entirety of the length. Further, the strain generation member 21 has the three contact fixing portions 21a that are in contact with and fixed to the outer diameter surface of the outer member 1 via spacers 23. The three contact fixing portions 21a are arranged in line in the longitudinal direction of the strain generation member 21. One strain detection element 22A among the two strain detection elements 22 is disposed between the contact fixing portion 21a at the left end and the contact fixing portion 21a at the center, and the other strain detection element 22B is disposed between the contact fixing portion 21a at the center and the contact fixing portion 21a at the right end, in FIG. 4.

As shown in FIG. 3, cut portions 21b are formed, in each lateral side portion of the strain generation member 21, at two positions corresponding to portions where the strain detection elements 22A, 22B, respectively, are positioned. A corner portion of each cut portion 21b has an arcuate cross sectional shape. The strain detection element 22 detects a strain in the circumferential direction around the cut portions 21b. It is desirable that the strain generation member 21 is not plastically deformed even in a state where an estimated maximum force is applied as an external force applied to the outer member 1 that serves as the stationary member or as a force acting between a tire and a road surface. This is because, if plastic deformation occurs, deformation of the outer member 1 is not transmitted to the sensor unit 20, and measurement of a strain may be affected. The estimated maximum force is, for example, a maximum force in a range where the vehicle-wheel bearing 100 is not damaged even if the force is applied thereto, and a normal function of the vehicle-wheel bearing 100 is restored when the force is removed.

In each sensor unit 20, the three contact fixing portions 21a of the strain generation member 21 are positioned in portions having the same size in the axial direction of the outer member 1, and the contact fixing portions 21a are spaced from each other in the circumferential direction. The contact fixing portions 21a are fixed to the outer diameter surface of the outer member 1 by means of bolts 24 via the spacers 23. Each bolt 24 is inserted into a bolt insertion hole 25 formed in each contact fixing portion 21a so as to penetrate in the radial direction, is then inserted into a bolt insertion hole 26 of each spacer 23, and is screwed into a screw hole 27 formed in an outer peripheral portion of the outer member 1. Thus, the contact fixing portions 21a are fixed via the spacers 23 to the outer diameter surface of the outer member 1. Therefore, a portion having each cut portion 21b in the strain generation member 21 that is thin-plate-shaped, is made distant from the outer diameter surface of the outer member 1, thereby facilitating strain deformation around the cut portions 21b.

In the description herein, as a position, in the axial direction, where the contact fixing portions 21a are disposed, a position, in the axial direction, around the raceway 3 in the row, on the outboard side, in the outer member 1, is selected. The position around the raceway 3 in the row on the outboard side is in a range from a mid-position between the raceway 3 in the row on the inboard side and the raceway 3 in the row on the outboard side, to a portion where the raceway 3 in the row on the outboard side is formed. In order to stably fix the sensor units 20 to the outer diameter surface of the outer member 1, a flat portion 1b is formed in a portion, of the outer diameter surface of the outer member 1, which is in contact with and fixed to each spacer 23.

Alternatively, a groove (not shown) may be formed, in each of mid-portions between three portions to which the three contact fixing portions 21a of the strain generation member 21 are fixed, in the outer diameter surface of the outer member 1. Thus, the spacers 23 may be eliminated and portions of the strain generation member 21 in which the cut portions 21b are positioned may be made distant from the outer diameter surface of the outer member 1.

As the strain detection element 22, various elements can be used. For example, the strain detection element 22 may be formed as a metal foil strain gauge. In this case, the strain detection element 22 is generally fixed to the strain generation member 21 by adhesion. Further, the strain detection element 22 may be formed, as a thick film resistor, on the strain generation member 21.

Further, in the structure shown in FIG. 3 and FIG. 4, an interval between the two contact fixing portions 21a that are among the three contact fixing portions 21a aligned in the circumferential direction on the outer diameter surface of the outer member 1 serving as the stationary member and that are positioned at both ends in the alignment, is set so as to be equal to a pitch P with which the rolling elements 5 are arranged. In this case, an interval, in the circumferential direction, between the two strain detection elements 22A, 22B each of which is positioned at a mid-position between the contact fixing portions 21a adjacent to each other, is set to be about ½ of the pitch P with which the rolling elements 5 are arranged. As a result, output signals S0, S1 from the two strain detection elements 22A, 22B are different in phase by about 180 degrees.

In the structure shown in FIG. 3 and FIG. 4, the interval between the contact fixing portions 21a positioned at both ends of the alignment, is set so as to be equal to the pitch P with which the rolling elements 5 are arranged, and each of the strain detection elements 22A, 22B is disposed at a mid-position between the contact fixing portions 21a adjacent to each other, whereby the interval, in the circumferential direction, between the two strain detection elements 22A, 22B is set to be about ½ of the pitch P with which the rolling elements 5 are arranged. Alternatively, the interval, in the circumferential direction, between the two strain detection elements 22A, 22B may be directly set so as to be ½ of the pitch P with which the rolling elements 5 are arranged.

In this case, the interval, in the circumferential direction, between the two strain detection elements 22A, 22B may be set so as to be {½ +n (n: integer)} times the pitch P with which the rolling elements 5 are arranged, or so as to be approximate thereto.

Since each sensor unit 20 is provided at a position, in the axial direction, around the raceway 3 in the row, on the outboard side, in the outer member 1, output signals from the strain detection elements 22A, 22B are influenced by the rolling element 5 that passes near a portion where the sensor unit 20 is mounted. Further, also when the bearing is at a stop, output signals from the strain detection elements 22A, 22B are influenced according to positions of the rolling elements 5. That is, when the rolling element 5 passes by the position closest to the strain detection elements 22A, 22B in each sensor unit 20 (or when the rolling element 5 is positioned at the closest position), the output signals from the strain detection elements 22A, 22B indicate maximum values, and the output signals are reduced according to a distance between the rolling element 5 and the closest position being increased (or when the rolling element 5 is distant from the closest position). When the bearing rotates, the rolling elements 5 sequentially pass near a portion where each sensor unit 20 is mounted, with a predetermined arrangement pitch P. Therefore, the output signals from the strain detection elements 22A, 22B have waveforms approximate to a sinusoidal wave that periodically varies in a cycle of the pitch with which the rolling elements 5 are arranged. Further, output signals from the strain detection elements 22A, 22B are influenced by temperature, or hysteresis due to, for example, sliding between surfaces of the knuckle 16 and the flange 1a for attachment to the vehicle body (FIG. 1).

In a case where the sensor unit 20 having the above structure is used as a load detecting sensor, for example, the signal vector may be outputted so as to indicate an amplitude value by calculating a difference between output signals from the two strain detection elements 22A, 22B, by means of the signal processor 31. In this case, since the output signals from the two strain detection elements 22A, 22B are different in phase by about 180 degrees as described above, the signal vector indicating the amplitude value can be obtained so as to cancel, by compensation, influence of temperature and/or influence of sliding between, for example, surfaces of the knuckle and the flange which appear in the output signals from the two strain detection elements 22A, 22B. Therefore, the signal vector is used as a variable in the following calculation in the load calculator 32, whereby load on the vehicle-wheel bearing 100 or on a tire tread can be calculated and estimated with enhanced accuracy.

Effects obtained by the embodiment of the present invention will be systematically described below.

Characteristics of the vehicle-wheel bearing 100 including individual differences are obtained by a testing machine, to prepare an individual standard load estimation coefficient MB, whereby difference in characteristic due to use conditions, such as difference of a material and a shape of a knuckle member to which the bearing 100 is fixed, difference between the left and right wheels, or difference in bearing mounting orientation, can be corrected by using the conversion coefficient T(k) to calculate the actual-state load estimation coefficient MC according to use conditions.

Since the actual-state load estimation coefficient MC based on actual use conditions can be calculated by using the standard load estimation coefficient MB obtained by the testing machine, a load application test for all the bearings 100 according to each condition under which each vehicle-wheel bearing 100 is mounted to an actual vehicle, need not be executed.

An effective calibration can be performed by a minimum test, thereby reducing production cost.

A parameter to be managed when the vehicle-wheel bearing 100 is shipped, is the standard load estimation coefficient MB only, thereby facilitating management and handling. As a result, management cost can be reduced.

Even when the same type of the vehicle-wheel bearings 100 are mounted at different wheel positions, or mounted to different types of vehicles, since parameters unique to a bearing and parameters regarding use conditions for a vehicle are separately managed, change processes associated with information, for an individual, which is stored in the bearing 100, are automatically executed, thereby enabling appropriate setting to be assuredly performed.

In the exemplary configuration shown in FIG. 5, when the bearing 100 has a bilaterally symmetric shape, a conversion coefficient for a mounting position only for one side may be prepared due to functions of swapping of input sensor signals and affine transformation for the actual-state load estimation coefficient MC (such as a coefficient sign swapping process), whereby not all the conversion coefficients may be prepared, and a memory region can be saved.

As described above, in the vehicle-wheel bearing device with the sensor, one or more sensor units 20 are provided as a sensor for detecting load on the bearing 100, and an output signal S from each sensor unit 20 is processed, by the signal processor 31, to generate a signal vector, and load acting on a wheel is calculated based on the signal vector by the load calculator 32. The load calculator 32 includes: the coefficient conversion processing unit 33 for calculating the actual-state load estimation coefficient MC that is a load estimation coefficient for a state where the bearing is mounted to an actual vehicle, based on the standard load estimation coefficient MB that is a determined standard load estimation coefficient for the bearing 100; and the load calculation unit 34 for calculating load on the wheel based on the signal vector and the actual-state load estimation coefficient MC calculated by the coefficient conversion processing unit 33. Therefore, an accurate load can be calculated and outputted by using a load estimation coefficient according to use conditions for the bearing 100.

When load acts between a tire of a wheel and a road surface, load is also applied to the outer member 1 serving as the stationary member of the vehicle-wheel bearing 100, to generate deformation. In the exemplary structure shown in FIG. 3 and FIG. 4, the three contact fixing portions 21a of the strain generation member 21 of each sensor unit 20 are in contact with and fixed to the outer member 1. Therefore, strain on the outer member 1 is easily enhanced and transmitted to the strain generation member 21, and the strain is detected by the strain detection elements 22A, 22B with a high sensitivity.

In the present embodiment, the number of the sensor units 20 provided is four, and the sensor units 20 are disposed on the upper surface portion, the lower surface portion, the right surface portion, and the left surface portion, which are located, on the outer diameter surface of the outer member 1, so as to correspond to upper-lower positions and left-right positions relative to a tire tread, such that the sensor units 20 are equally spaced from each other in the circumferential direction so as to be different in phase by 90 degrees. Therefore, the load Fz on the vehicle-wheel bearing 100 in the vertical diction, the load Fx thereon in the front-rear direction, and the load Fy thereon in the axial direction, can be estimated.

In the present embodiment, the outer member 1 serves as a stationary member. However, the present invention is applicable to a vehicle-wheel bearing in which the inner member servers as a stationary member. In this case, the sensor units 20 are mounted on a peripheral surface, in an inner circumference, of the inner member.

Further, in the present embodiment, the present invention is applied to the vehicle-wheel bearing 100 of the third generation type. However, the present invention is also applicable to a vehicle-wheel bearing of the first or second generation type in which a bearing portion and a hub are separate components, or a vehicle-wheel bearing of the fourth generation type in which a portion of an inner member is formed by an outer ring of a constant velocity joint. Further, the vehicle-wheel bearing device with the sensor is also applicable to a vehicle-wheel bearing for a driven wheel. Further, the vehicle-wheel bearing device with the sensor is also applicable to tapered roller type vehicle-wheel bearings of each generation type.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Outer member
2 . . . Inner member
3, 4 . . . Raceway
5 . . . Rolling element
20 . . . Sensor unit
21 . . . Strain generation member
21a . . . Contact fixing portion
22, 22A, 22B . . . Strain detection element
31 . . . Signal processor
32 . . . Load calculator
33 . . . Coefficient conversion processing unit
34 . . . Load calculation unit
35 . . . Conversion coefficient storage section
36 . . . Parameter storage section
37 . . . MC storage unit
38 . . . ID memory
39 . . . MB memory
40 . . . Nonvolatile ID memory
41 . . . Nonvolatile MB memory
42 . . . Wheel-position-corresponding transform command section
43 . . . Swapping circuit
100 . . . Vehicle-wheel bearing

What is claimed is:

1. A vehicle-wheel bearing device with a sensor comprising:
a vehicle-wheel bearing for rotatably supporting a wheel relative to a vehicle body including: an outer member having an inner periphery formed with a plurality of raceways; an inner member having an outer periphery formed with raceways held in face to face relation to the raceways of the outer member; and a plurality of rows of rolling elements interposed between the raceways of the outer member and the inner member that are held in face to face relation to each other;
a plurality of sensors, mounted to the vehicle-wheel bearing, to detect load acting on the bearing;
a signal processor to process an output signal from each sensor to generate a signal vector; and
a load calculator to calculate a load acting on the wheel based on the signal vector,
wherein the load calculator includes:
a coefficient conversion processing unit to calculate an actual-state load estimation coefficient MC that is a load estimation coefficient for a state where the bearing is mounted to an actual vehicle, based on a standard load estimation coefficient MB that is a determined standard load estimation coefficient for the bearing; and
a load calculation unit for calculating a load acting on the wheel based on the signal vector and the actual-state load estimation coefficient MC calculated by the coefficient conversion processing unit,
wherein the coefficient conversion processing unit of the load calculator includes
a conversion coefficient storage section to store a conversion coefficient T(k) used for conversion from the standard load estimation coefficient MB to the actual-state load estimation coefficient MC; and
a parameter storage section to store a parameter k used for designation a state under which the bearing is mounted to the vehicle.

2. The vehicle-wheel bearing device with the sensor as claimed in claim 1, wherein the parameter k includes at least one of a parameter for designating a vehicle type, a parameter for designating a position at which the bearing is mounted, and a parameter for designating an ON/OFF state of a brake.

3. The vehicle-wheel bearing device with the sensor as claimed in claim 1, wherein the bearing is mounted with an ID memory in which ID information to identify the bearing is written, and the coefficient conversion processing unit of the load calculator includes a nonvolatile ID memory into which the ID information read from the ID memory is stored in an initialization process.

4. The vehicle-wheel bearing device with the sensor as claimed in claim 1, wherein the bearing is mounted with an MB memory in which the standard load estimation coefficient MB is written, and the coefficient conversion processing unit of the load calculator is capable of reading the standard load estimation coefficient MB from the MB memory.

5. The vehicle-wheel bearing device with the sensor as claimed in claim 1, wherein a data file of the standard load estimation coefficient MB designated by the ID information to identify the bearing is separately supplied from the outside to the coefficient conversion processing unit of the load calculator.

6. The vehicle-wheel bearing device with the sensor as claimed in claim 1, wherein three or more sensors for detecting load on the bearing are provided, and the load calculator calculates a load Fz acting on the vehicle-wheel bearing in the vertical direction, a load Fx acting thereon in a front-rear direction, and a load Fy acting thereon in an axial direction, based on output signals from the three or more sensors.

7. The vehicle-wheel bearing device with the sensor as claimed in claim 1, wherein the sensors to detect load acting on the bearing detect relative displacement between the outer member and the inner member.

8. The vehicle-wheel bearing device with the sensor as claimed in claim 1, wherein the sensors to detect load acting on the bearing detect a strain of one of the outer member and the inner member that serves as a stationary member.

9. The vehicle-wheel bearing device with the sensor as claimed in claim 8, wherein each sensor comprises at least one sensor unit provided on an outer diameter surface of the stationary member served by one of the outer member and the inner member, the at least one sensor unit including:
 a strain generation member that is in contact with and fixed to the outer diameter surface of the stationary member; and
 one or more strain detection elements to detect a strain of the strain generation member.

10. The vehicle-wheel bearing device with the sensor as claimed in claim 9, wherein the at least one sensor unit comprises four sensor units disposed on an upper surface portion, a lower surface portion, a right surface portion, and a left surface portion, respectively, of the outer diameter surface of the stationary member, so as to correspond to upper-lower positions and left-right positions relative to a tire tread, such that the four sensor units are equally spaced from each other in a circumferential direction so as to be different in phase by 90 degrees.

11. The vehicle-wheel bearing device with the sensor as claimed in claim 9, wherein the strain generation member includes three or more contact fixing positions that are in contact with and fixed to the outer diameter surface of the stationary member, and
 the one or more strain detection elements comprises two or more strain diction elements mounted to the strain generation member k to detect a strain on the strain generation member.

12. The vehicle-wheel bearing device with the sensor as claimed in claim 11, wherein the strain detection elements are disposed between a first and a second contact fixing portions of the strain generation member, adjacent to each other, and between the second and a third contact fixing portions thereof adjacent to each other, respectively, and an interval between the contact fixing portions adjacent to each other, or an interval between the strain detection elements adjacent to each other is set to n+½ times an arrangement pitch of the rolling elements, where n is an integer.

13. A vehicle-wheel bearing device with a sensor comprising:

a vehicle-wheel bearing for rotatably supporting a wheel relative to a vehicle body including: an outer member having an inner periphery formed with a plurality of raceways; an inner member having an outer periphery formed with raceways held in face to face relation to the raceways of the outer member; and a plurality of rows of rolling elements interposed between the raceways of the outer member and the inner member that are held in face to face relation to each other;
a plurality of sensors, mounted to the vehicle-wheel bearing, to detect load acting on the bearing;
a signal processor to process an output signal from each sensor to generate a signal vector; and
a load calculator to calculate a load acting on the wheel based on the signal vector,
wherein the load calculator includes
 a coefficient conversion processing unit to calculate an actual-state load estimation coefficient MC that is a load estimation coefficient for a state where the bearing is mounted to an actual vehicle, based on a standard load estimation coefficient MB that is a determined standard load estimation coefficient for the bearing; and
 a load calculation unit for calculating a load acting on the wheel based on the signal vector and the actual-state load estimation coefficient MC calculated by the coefficient conversion processing unit,
 wherein the coefficient conversion processing unit of the load calculator includes a wheel-position-corresponding transform command section to provide a command to transform a sequence of the signal vector to be inputted from the signal processor to the load calculation unit of the load calculator and to transform a sequence of the actual-state load estimation coefficient MC to be supplied from the coefficient conversion processing unit to the load calculation unit, according to whether a mounting position of the wheel is a left-side position or a right-side position.

14. The vehicle-wheel bearing device with the sensor as claimed in claim 13, wherein the signal processor includes a swapping circuit to transform a sequence of the signal vector according to the command from the wheel-position-corresponding transform command section.

15. A vehicle-wheel bearing device with a sensor comprising:

a vehicle-wheel bearing for rotatably supporting a wheel relative to a vehicle body including: an outer member having an inner periphery formed with a plurality of raceways; an inner member having an outer periphery formed with raceways held in face to face relation to the raceways of the outer member; and a plurality of rows of rolling elements interposed between the raceways of the outer member and the inner member that are held in face to face relation to each other;
a plurality of sensors, mounted to the vehicle-wheel bearing, to detect load acting on the bearing;
a signal processor to process an output signal from each sensor to generate a signal vector: and
a load calculator to calculate a load acting on the wheel based on the signal vector,
wherein the load calculator includes
 a coefficient conversion processing unit to calculate an actual-state load estimation coefficient MC that is a load estimation coefficient for a state where the bearing is mounted to an actual vehicle, based on a standard load estimation coefficient MB that is a determined standard load estimation coefficient for the bearing; and a load calculation unit for calculating a load acting on the wheel based on the signal vector and the actual-state load estimation coefficient MC calculated by the coefficient conversion processing unit, wherein wherein a series of sequencing processes for calculating the actual-state load estimation coefficient MC by the coefficient conversion processing unit of the load calculator is executed in an initialization process.

16. A vehicle-wheel bearing device with a sensor comprising:

a vehicle-wheel bearing for rotatably supporting a wheel relative to a vehicle body including an outer member having an inner periphery formed with a plurality of raceways; an inner member having an outer periphery formed with raceways held in face to face relation to the raceways of the outer member; and a plurality of rows of rolling elements interposed between the raceways of the outer member and the inner member that are held in face to face relation to each other;

a plurality of sensors, mounted to the vehicle-wheel bearing, to detect load acting on the bearing;

a signal processor to process an output signal from each sensor to generate a signal vector:

an ID memory to store ID information of the bearing; and a load calculator to calculate a load acting on the wheel based on the signal vector, wherein the load calculator includes a coefficient conversion processing unit to calculate an actual-state load estimation coefficient MC that is a load estimation coefficient for a state where the bearing is mounted to an actual vehicle, based on a standard load estimation coefficient MB that is a determined standard load estimation coefficient for the bearing; and a load calculation unit for calculating a load acting on the wheel based on the signal vector and the actual-state load estimation coefficient MC calculated by the coefficient conversion processing unit, wherein the coefficient conversion processing unit of the load calculator includes a nonvolatile ID memory into which the ID information read from the ID memory is stored in an initialization process, and the coefficient conversion processing unit of the load calculator has a function of reading the ID information from the ID memory when power for the load calculator is ON, and comparing the ID information with ID information stored in the nonvolatile ID memory, to confirm whether or not connection to a normal bearing associated in an initial setting is established.

* * * * *